United States Patent [19]
Bley

[11] Patent Number: 5,895,035
[45] Date of Patent: Apr. 20, 1999

[54] PIPE FITTING APPARATUS

[76] Inventor: C. Barton Bley, #212, 9768-170 Street, Edmonton, Alberta, Canada, T5T 5L4

[21] Appl. No.: 08/858,869

[22] Filed: May 19, 1997

[51] Int. Cl.$^6$ .................................................. B25B 1/00
[52] U.S. Cl. ............................................................ 269/6
[58] Field of Search ............................ 81/421, 422, 423, 81/424; 269/6, 96, 163, 259, 262, 271, 279

[56] References Cited

U.S. PATENT DOCUMENTS 5,377,567  1/1995  Sorensen ................................. 81/426

*Primary Examiner*—David A. Scherbel
*Assistant Examiner*—Benjamin M. Halpern
*Attorney, Agent, or Firm*—McAfee & Taft

[57] ABSTRACT

A pipe fitting apparatus for holding a pair of pipe fittings together such that the pipe fittings may be welded. The apparatus is designed for use by a single operator. The apparatus comprises a pair of handles interconnected by a conventional locking toggle apparatus and having first and second clamping jaws extending from the handles such that the first and second clamping jaws may be clampingly engaged with a first pipe fitting. A lower support extends from one of said clamping jaws and provides adjustable support for a lower portion of a second pipe fitting adjacent to the first pipe fitting. An upper support provides supporting engagement for a distal upper end of the second pipe fitting and includes an arm holder attached to one of the clamping jaws and a support arm slidably connected to the arm holder and which may be locked in a supporting position. The arm holder provides pivotation of the support arm in two axes so that the support arm may be moved as necessary to accommodate different sizes and shapes of fittings.

28 Claims, 3 Drawing Sheets

PIPE FITTING APPARATUS

BACKGROUND OF THE INVENTION

1. Field of the Invention

This invention relates to apparatus used for holding pipe fittings, including pipe sections, so that they can be welded together, and more particularly, to a pipe fitting apparatus which clamps onto one pipe fitting and supports a second pipe fitting adjacent thereto so that the welding can be carried out by a single person.

2. Brief Description of the Prior Art

Weldable pipe fittings are well known for many uses requiring piping systems. In addition to sections of the pipe itself, these pipe fittings can include tees, elbows, nipples, reducers, flange connections, etc. The opening in such fittings are typically circular and have beveled edges. The mating beveled edges form an annular V-shaped groove which is filled with material during the welding process.

In welding pipe fittings together, it is necessary to support one fitting adjacent to another so that the beveled edges are butted together. In order to do this, typically a separate device must be used to hold each of the fittings. Such holding devices, such as vises, are relatively large and not easily transported by a single person. If such large holding devices are not available, or inconvenient to use, typically a welding assistant must hold the pipe fittings together so that the welder can start the welding process. In addition to requiring a second person, which adds to expenses, there are other problems. Having a second person involved increases safety risks since the person must hold the fitting during the welding, thus creating a possibility of burns. Further, a person simply holding two fittings together may not be able to hold the fittings steady enough to insure the proper alignment that is usually required.

The present invention solves these problems by providing a pipe fitting apparatus which clamps against one of the fittings and supports the second fitting adjacent thereto so that the welding can be carried out by a single person. The present invention is a lightweight device, easily transported, and does not require a welding assistant. In addition, the present invention solves alignment problems because it is designed to precisely hold the pipe fittings in proper alignment during the welding process. Further, the design of the present invention is sufficiently flexible that a great variety of types and sizes of fittings may be connected together.

SUMMARY OF THE INVENTION

The pipe fitting apparatus of the present invention is adapted for use in affixing first and second pipe fittings together, such as by welding, by a single person. The apparatus comprises a first clamping jaw, a second clamping jaw movably connected to the first clamping jaw, an adjusting means for adjusting a distance between the first and second clamping jaws such that the first and second clamping jaws may be clampingly engaged with a portion of the first pipe fitting, a first support extending from one of the first and second clamping jaws for supportingly engaging a lower portion of the second pipe fitting, and a second support extending from the other of the first and second clamping jaws for supportingly engaging an upper portion of the second pipe fitting. The first and second supports thereby support the second pipe fitting in a connecting position adjacent to the first pipe fitting.

The first support preferably comprises a boss extending from the one of the first and second clamping jaws, and an adjustable member, such as a screw, threadingly engaged with the boss such that the screw may be adjustably positioned to engage the lower portion of the second pipe fitting.

In a preferred embodiment, one of the first and second clamping jaws has an L-shaped or chevron configuration with a pair of legs. The boss in the first support is one of a pair of such bosses, each of the bosses extending from a corresponding one of the legs, and the screw in the first support is one of a pair of screws, each of the screws being threadingly engaged with a corresponding one of the bosses.

The second support preferably comprises an arm holder connected to the other of the first and second clamping jaws, and a support arm adjustably extending from the arm holder. The support arm has a distal end adapted for engaging the upper portion of the second pipe fitting. The arm holder comprises first and second pivots such that the support arm may be selectively rotated in two axes with respect to the second pipe fitting.

The arm holder preferably comprises an arm adapter adapted for receiving a proximal end of the control arm therein, an internally threaded member attached to the arm adapter, and a first externally threaded member threadingly engaged with the internally threaded member. The first pivot is provided by rotating threaded interaction of the first externally threaded member with the internally threaded member. The arm holder also comprises a second externally threaded member attached to the first externally threaded member. The second externally threaded member is threadingly engaged with the other of the first and second clamping jaws. The second pivot is provided by rotating threaded interaction between the second externally threaded member and this clamping jaw.

The support arm is slidably received in the arm holder, and the apparatus further comprises locking means for locking the support arm with respect to the arm holder. This locking means may be characterized by a screw threadingly engaged with the arm holder and adapted for locking against the proximal end of the control arm.

Stated in another way, the pipe fitting apparatus of the present invention is designed for use in connecting a pair of pipe fittings to one another, and the apparatus comprises a first clamping jaw having a clamping surface thereon and a second clamping jaw having a pair of clamping surfaces thereon. The first and second clamping jaws are pivotally connected and have a clamping position for clamping engagement with a first of the pipe fittings. The apparatus also comprises a first support for supporting a first end of the second of the pipe fittings adjacent to the first pipe fitting and a second support for supporting a second end of the second pipe fitting opposite the first end, such that the second pipe fitting is substantially rigidly held against the first pipe fitting for welding therebetween.

Numerous objects and advantages of the invention will become apparent as the following detailed description of the preferred embodiment is read in conjunction with the drawings which illustrate such embodiment.

DETAILED DESCRIPTION OF THE PREFERRED EMBODIMENT

Figure 1:
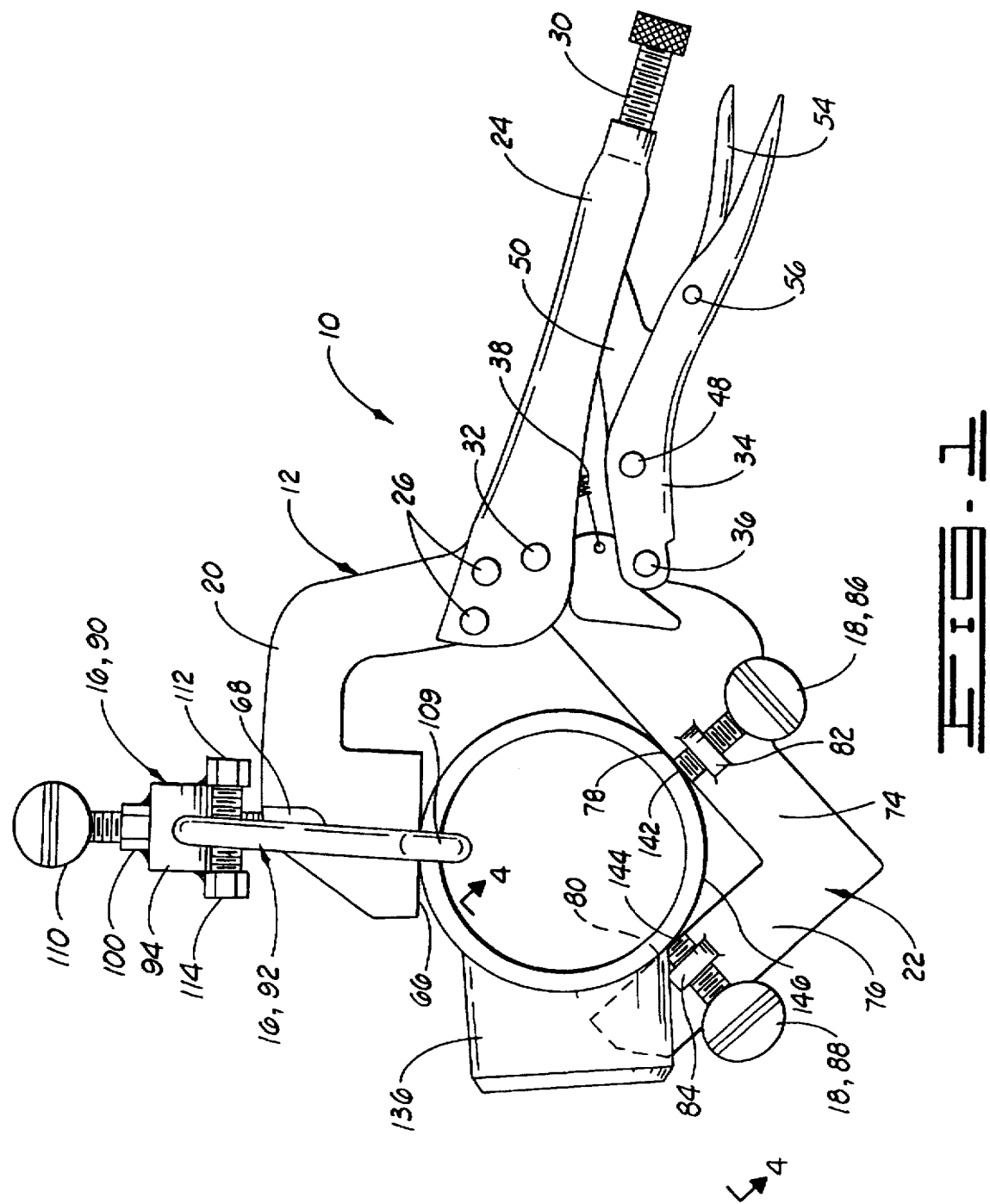
FIG. 1 is a side view of the pipe fitting apparatus of the present invention shown in operation holding a pipe fitting.

Referring now to the drawings, and more particularly to FIG. 1, the pipe fitting apparatus of the present invention is shown and generally designated by the numeral 10. Apparatus 10 comprises a main clamp assembly 12 adapted for clamping engagement with a pipe fitting, such as pipe section 14 shown in FIG. 3. Apparatus 10 also comprises an upper support assembly 16 and lower supports 18.

Figure 2:
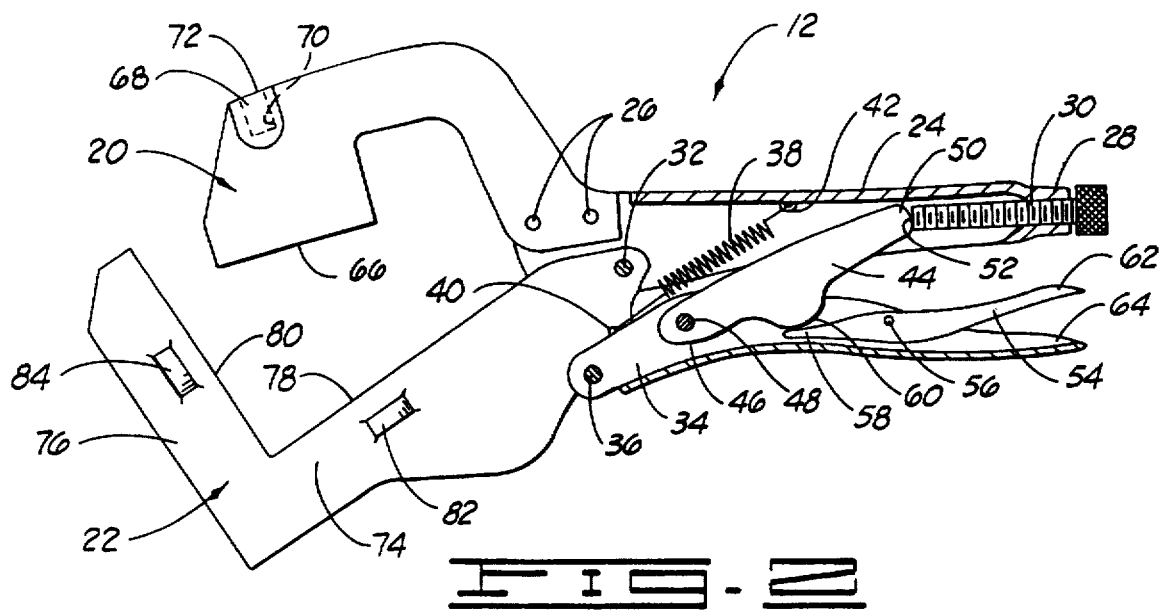
FIG. 2 shows a partial vertical cross section of the pipe fitting apparatus.

Referring now to FIG. 2, it will be seen that clamp assembly 12 comprises a first clamping jaw 20 with a second clamping jaw 22 disposed oppositely therefrom. First clamping jaw 20, which may also be referred to as stationary clamping jaw 20, has a first or stationary handle portion 24 extending longitudinally therefrom. First clamping jaw 20 and first handle portion 24 may be integrally formed, or they may be separate components fixedly connected by a fastening means, such as a pair of rivets 26. A distal end 28 of first handle portion 24 has a substantially cylindrical configuration with an adjusting screw 30 threadingly engaged therein.

Second clamping jaw 22, also referred to as movable clamping jaw 22, is pivotally connected to first handle portion 24 at pivot 32. Second clamping jaw 22 is also pivotally connected to a second, longitudinally extending handle portion 34, also referred to as movable handle portion 34, at another pivot 36.

A biasing means, such as spring 38, interconnects a spring connection point 40 on second clamping jaw 22 with another spring connection point 42 on first handle portion 24. It will be seen by those skilled in the art that spring 38 thus biases second clamping jaw 22 such that it tends to rotate counterclockwise (as seen in FIG. 2) about pivot 32 and thus away from first clamping jaw 20.

A toggle link member 44 has a first end 46 pivotally connected to second handle portion 34 at a pivot 48. A second end 50 of toggle link member 44 is adapted for engagement by an end 52 of adjusting screw 30.

A release lever 54, is pivotally attached to second handle portion 34 at a pivot 56 and has a first end 58 which is engagable with a projection 60 on toggle link member 44. Release lever 54 has a second end 62 which extends longitudinally adjacent to distal end 64 of second handle portion 34.

First handle portion 24, adjusting screw 30, second handle portion 34, spring 38, toggle link member 44 and release lever 54 all cooperate to provide a locking pliers mechanism, which may also be referred to as a toggle mechanism, of a kind generally known in the art. However, first clamping jaw 20 and second clamping jaw 22 are unique to the present invention.

First clamping jaw 20 has a generally inverted U-shaped configuration and defines a substantially flat clamping surface 66 thereon. First clamping jaw 20 has an enlarged boss portion 68 thereon with a threaded opening 70 defined within the boss. An upper surface 72 of boss 68, which defines an open end of threaded opening 70, faces in a direction substantially opposite from clamping surface 66.

Second clamping jaw 22 is generally chevron-shaped, which may also be described as L-shaped. Thus, second clamping jaw 22 has a first leg portion 74 and a second leg portion 76 extending substantially normally from first leg portion 74. First leg portion 74 defines a first substantially flat clamping surface 78 thereon, and second leg portion 76 defines a second substantially flat clamping surface 80 thereon. First clamping surface 78 and second clamping surface 80 of second clamping jaw 22 generally face clamping surface 66 on first clamping jaw 20. When clamping pipe section 14, the clamping surfaces thus contact the pipe section at three points.

Figure 3:
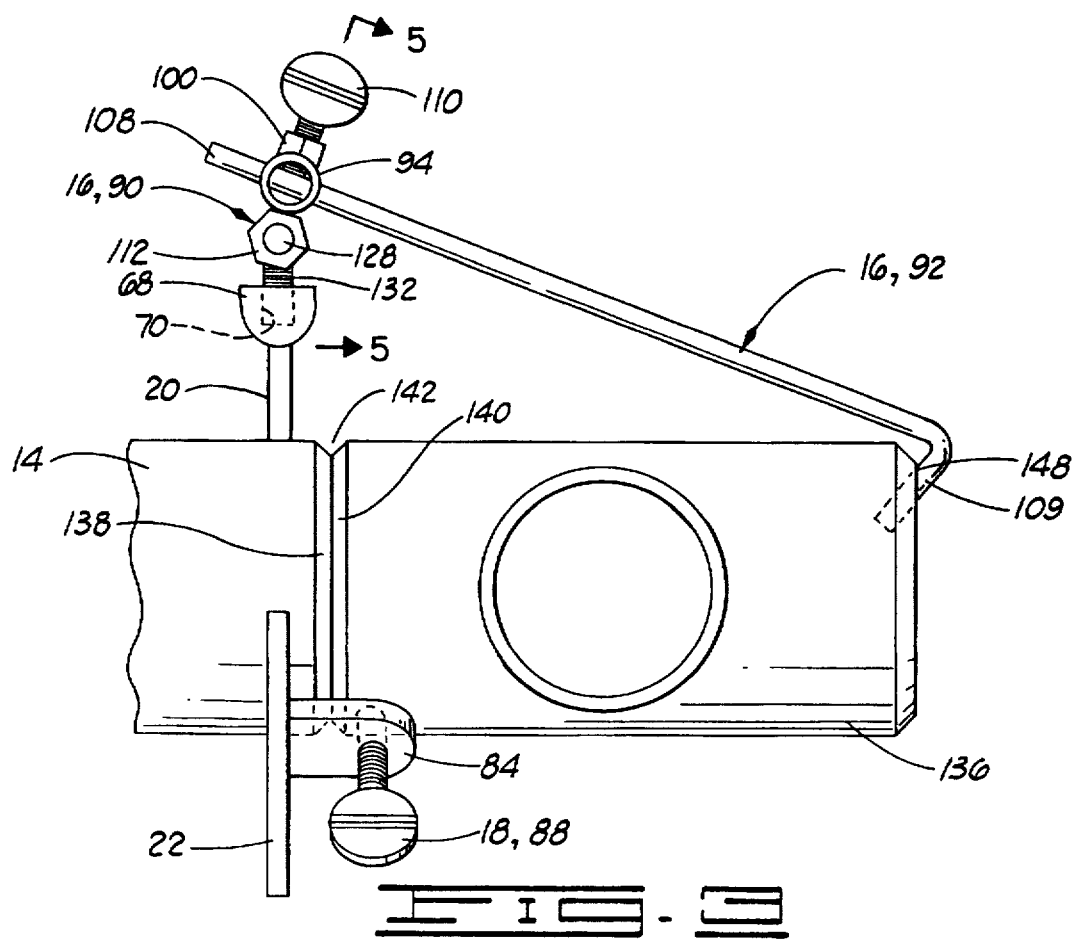
FIG. 3 is an end view as seen from the left side of FIG. 1 showing the apparatus in use supporting a pair of pipe fittings adjacent to one another.
Figure 4:
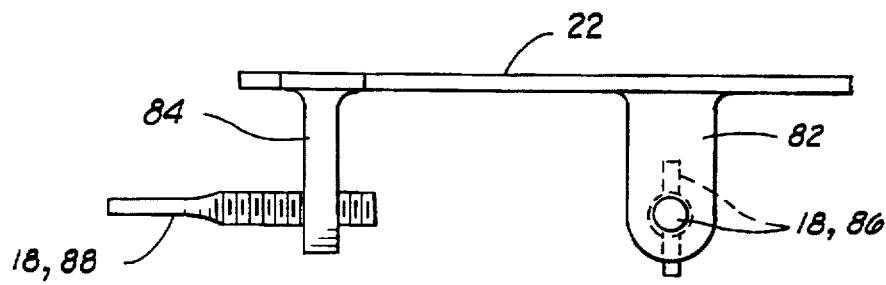
FIG. 4 presents a detailed view of one jaw of the apparatus.

A first support boss 82 extends perpendicularly from first leg portion 74 of second clamping jaw 22 and will be seen to be in a plane substantially parallel to first clamping surface 78. Similarly, a second support boss 84 extends perpendicularly from second leg portion 76 of second clamping jaw 22 and is in a plane substantially parallel to second clamping surface 80. Referring to FIGS. 1, 3 and 4, lower supports 18 preferably comprise bosses 82 and 84 and first and second adjusting members, such as first and second thumb screws 86 and 88. First thumb screw 86 is threadingly engaged with first support boss 82, and second thumb screw 88 is threadingly engaged with second support boss 84.

Referring now to FIGS. 1 and 3, upper support assembly 16 comprises an arm holder 90 and an elongated support arm 92 slidably engaged therewith.

Figures 5, 6:
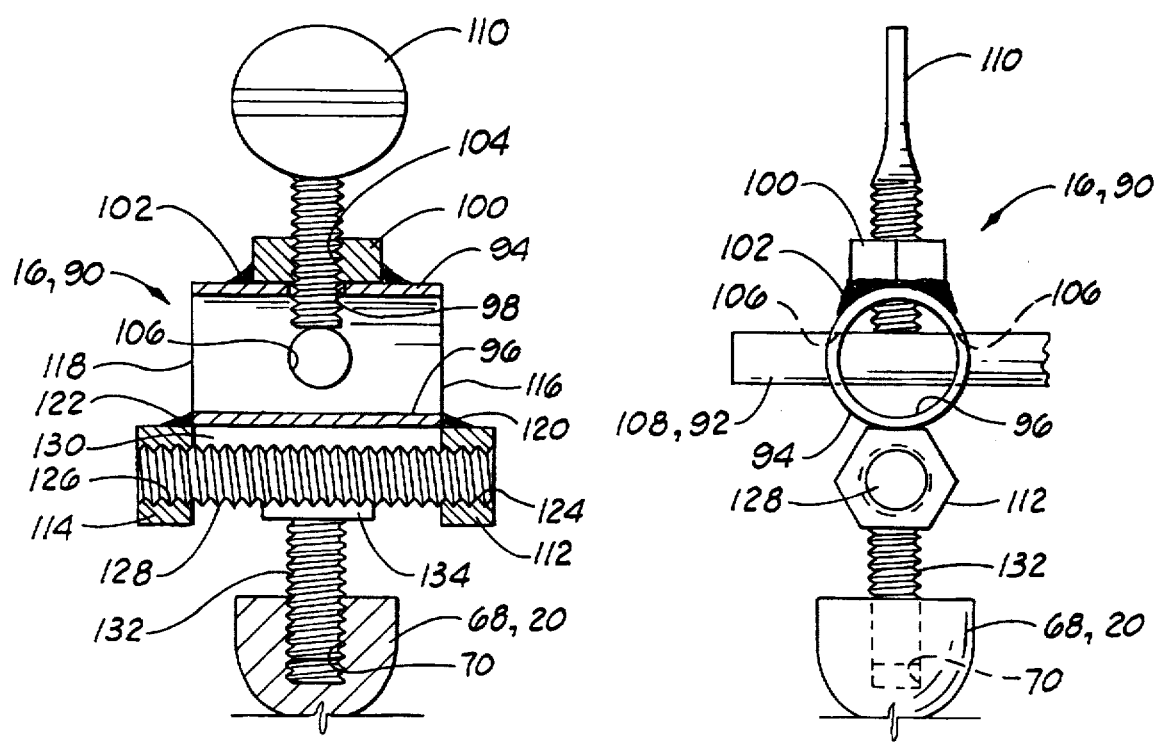
FIG. 5 is a cross section of an arm holder taken along lines 5—5 in FIG. 3.
FIG. 6 is an end view of the arm holder shown in FIG. 5.

Referring to the detail views in FIGS. 5 and 6, arm holder 90 has a substantially cylindrical arm adapter 94 defining a central opening 96 therethrough. A transverse opening 98 is also defined in arm holder 94 and has an axis substantially perpendicular to a central axis of central opening 96. An internally threaded member, such as a nut 100, is fixedly attached to arm adapter 94 in a manner known in the art, such as by weld 102. Nut 100 defines a threaded opening 104 therein which is substantially aligned with transverse opening 98 in arm adapter 94.

Arm adapter 94 also defines a pair of aligned arm receiving openings 106 defined therein which are adapted for receiving a first, proximal end 108 of support arm 92 therethrough. Support arm 92 is preferably substantially L-shaped and also has a second, distal end 109 extending from the main portion of the support arm, as best seen in FIGS. 1 and 3.

It will be seen that arm receiving openings 106 define an axis which is substantially perpendicular to the axis of central opening 96 of arm adapter 94, and is also substantially perpendicular to the axis of transverse opening 98 in the arm adapter and threaded opening 104 in nut 100. As best seen in FIGS. 1 and 6, a locking means, such as a thumb screw 110, is threadingly engaged with threaded opening 104 and nut 100 and extends through transverse opening 98 into central opening 96 for locking proximal end 108 of support arm 92 with respect to arm adapter 94, as will be further described herein.

Still referring to FIGS. 5 and 6, a pair of internally threaded members, such as nuts 112 and 114, are attached to ends 116 and 118 respectively of arm adapter 94. Nuts 110 extend away from arm adapter 94 in a direction substantially opposite from nut 100. Nuts 112 and 114 are fixedly attached to arm adapter 94 in a manner known in the art, such as by welds 120 and 122, respectively.

Nuts 112 and 114 define threaded openings 124 and 126 therethrough, respectively. Threaded openings 124 and 126 are aligned so that an axis defined thereby is substantially parallel to the axis of central opening 96 of arm adapter 94. A first externally threaded member, such as a threaded rod 128, is threadingly engaged with threaded openings 124 and 126 and is spaced from arm adapter 94 such that a gap 130 is defined therebetween. It will be seen that a first pivot is formed because there is relative rotation between threaded rod 128 and nuts 124 and 126, and the axis of this first pivot is substantially horizontal. Thus, there is relative rotation between threaded rod 128 and arm adapter 94, and it will be further be seen that this provides relative rotation between threaded rod 128 and support arm 92 when support arm 92 is locked to arm adapter 94 by thumb screw 110.

A second threaded member, such as threaded post 132, is fixedly attached to an intermediate portion of threaded rod 128 by a means known in the art, such as a weld 134. Threaded post 132 extends substantially perpendicularly from threaded rod 128. Threaded post 132 is adapted for threading, and thus rotational, engagement with threaded opening 70 in boss 68 on first clamping jaw 20. This threaded engagement provides a second pivot which has an axis substantially perpendicular to the first pivot. Thus, the entire upper support assembly 16, including arm holder 90 and support arm 92 locked therewith may be pivoted about the axis of threaded post 132 with respect to first clamping jaw 20.

Referring to FIGS. 1 and 6, the assembly formed by nuts 112 (and 114), arm adapter 94 and nut 100 may be pivoted about threaded rod 128. FIG. 6 shows the axis of thumb screw 110 substantially aligned with the axis of threaded post 132, and FIG. 1 shows a position in which there has been angular rotation therebetween. Arm holder 90 will be seen to provide a dual swivel or pivot configuration with respect to first clamping jaw 20 so that support rod 92 may be positioned as desired with respect to various shapes and sizes of pipe fittings to be attached to one another, as further described herein.

OPERATION OF THE INVENTION

When it is desired to attach a pair of pipe fittings using apparatus 10, the initial step is to adjust the distance between first clamping jaw 20 and second clamping jaw 22. This is done by rotation of adjusting screw 30 which operates through the toggle system previously described. This adjustment is in a manner known in the art. Basically, it is desirable that the distance between first and second clamping jaws 20 and 22 be such that clamping surfaces 66, 78 and 80 will tightly grip one of the pipe fittings, for example pipe section 14 shown in FIG. 3. When this clamping distance between first and second clamping jaws 20 and 22 has been properly adjusted, the operator will depress second end 62 of release lever 54 toward distal end 64 of second handle portion 32 which releases the toggle mechanism to its open position, again in a manner known in the art.

Pipe section 14 is fixed in a position for welding; for example, pipe section 14 may be locked into a vise, or it may simply be held in place by other portions (not shown) of the piping system. Clamp assembly 12 is then positioned around a free end of pipe section 14, and second handle portion 34 is moved toward first handle portion 24 to a locked, clamping position, by engagement of clamping surfaces 66, 78 and 80 at three points on pipe section 14.

Once clamp assembly 12 is so positioned, a second pipe fitting, such as tee 136, is manually positioned adjacent to pipe section 14. Typically these pipe fittings will have beveled edges, such as beveled edge 138 on pipe section 14 and beveled edge 140 on tee 136. Beveled edges 138 and 140 match one another so that, when tee 136 is positioned against pipe section 14, an annular V-shaped groove 142 of a kind known in the art is defined therebetween. Of course, groove 142 is filled with welding material during the welding process.

Once tee 136 is manually positioned against pipe section 14, lower supports 18 are adjusted by rotating thumb screws 86 and 88 such that ends 142 and 144 of the thumb screws, respectively, engage and support an outer surface 146 of tee 136, as best seen in FIG. 1. This also aligns tee 136 with respect to pipe section 14.

Referring to FIGS. 1 and 3, with thumb screw 110 loosened in upper support assembly 16, distal end 109 of support arm 92 may be moved so it may be positioned around an upper and outer edge portion 148 of tee 136. The dual pivoting about threaded rod 128 and threaded post 132 of arm holder 90 is used as necessary to position distal end 109 of support arm 92. Support arm 92 is moved toward arm holder 90 until distal end 109 locks against tee 136, and thumb screw 110 is rotated to lock the support arm with respect to the arm holder. It will be seen by those skilled in the art that this locked support of upper support assembly 16 combined with the support provided by lower supports 18 substantially rigidly holds tee 136 in place abutting, and aligned with, pipe section 14. At this point, the welding process may be carried out to fixedly attached tee 136 to pipe section 14 by filling annular groove 142 with weld material.

This procedure may be repeated as necessary for additional pipe fittings. Because of the dual swivel arrangement of arm holder 90 and the adjustable positioning of distal end 109 of support arm 92 with respect to arm holder 90 along with the adjustability of clamp assembly 12 and lower supports 18, apparatus 10 may be adapted to clamp pipe fittings of various sizes and configurations together. Apparatus 10 thus provides a very flexible way of holding various pairs of pipe fittings together for welding by a single operator. No additional personnel are necessary.

It will be seen, therefore, that the pipe fitting apparatus of the present invention is well adapted to carry out the ends and advantages mentioned as well as those inherent therein. While a presently preferred embodiment of the apparatus is shown and described for the purposes of this disclosure, numerous changes in the arrangement and construction of parts may be made by those skilled in the art. All such changes are encompassed within the scope and spirit of the appended claims.

What is claimed is:

1. A pipe fitting apparatus for use in affixing first and second pipe fittings together, said apparatus comprising:

a first clamping jaw;

a second clamping jaw movably connected to said first clamping jaw;

an adjusting means for adjusting a distance between said first and second clamping jaws such that said first and second clamping jaws may be clampingly engaged with a portion of the first pipe fitting;

a first support extending from one of said first and second clamping jaws for supportingly engaging a lower portion of the second pipe fitting; and a second support extending from the other of said first and second clamping jaws for supportingly engaging an upper portion of the second pipe fitting, said first and second supports thereby supporting the second pipe fitting in a connecting position adjacent to the first pipe fitting.

2. The apparatus of claim 1 wherein:

one of said first and second clamping jaws has an L-shaped configuration such that it may be engaged with the first pipe fitting at two points; and the other of said first and second clamping jaws engages the first pipe fitting on an opposite side of the first pipe fitting from said one clamping jaw.

3. The apparatus of claim 1 wherein said first support comprises:
   a boss extending from said one of said first and second clamping jaws; and
   a screw threadingly engaged with said boss such that said screw may be adjustably positioned to engage the lower portion of the second pipe fitting.

4. The apparatus of claim 3 wherein:
   said one of said first and second clamping jaws has an L-shaped configuration with a pair of legs;
   said boss is one of a pair of bosses, each of said bosses extending from a corresponding one of said legs; and
   said screw is one of a pair of screws, each of said screws being threadingly engaged with a corresponding one of said bosses.

5. The apparatus of claim 1 wherein said second support comprises:
   an arm holder connected to the other of said first and second clamping jaws; and
   a support arm adjustably extending from said arm holder and having a distal end adapted for engaging the upper portion of the second pipe fitting.

6. The apparatus of claim 5 wherein said arm holder comprises first and second pivots such that said support arm may be selectively rotated in two axes with respect to the second pipe fitting.

7. The apparatus of claim 6 wherein said arm holder comprises:
   an arm adapter adapted for receiving a proximal end of said control arm therein;
   an internally threaded member attached to said arm adapter;
   a first externally threaded member threadingly engaged with said internally threaded member, said first pivot being provided by rotating threaded interaction of said first externally threaded member and said internally threaded member; and
   a second externally threaded member attached to said first externally threaded member and threadingly engaged with said other of said first and second clamping jaws, said second pivot being provided by rotating threaded interaction between said second externally threaded member and said other of said first and second clamping jaws.

8. The apparatus of claim 5 wherein said support arm is slidably received in said arm holder; and
   further comprising locking means for locking said support arm with respect to said arm holder.

9. The apparatus of claim 8 wherein said locking means comprises a screw threadingly engaged with said arm holder and adapted for locking against a proximal end of said control arm.

10. The apparatus of claim 5 wherein said support arm has a substantially L-shaped configuration.

11. A pipe fitting apparatus for use in connecting a pair of pipe fittings to one another, said apparatus comprising:
    a first clamping jaw having a clamping surface thereon;
    a second clamping jaw having a pair of clamping surfaces thereon, said first and second clamping jaws being pivotally connected and having a clamping position for clamping engagement with a first of the pipe fittings;
    a first support for supporting a first end of a second of the pipe fittings adjacent to the first pipe fitting; and
    a second support for supporting a second end of the second pipe fitting opposite the first end such that the second pipe fitting is substantially rigidly held against the first pipe fitting for welding therebetween.

12. The apparatus of claim 11 wherein said second clamping jaw has a substantially L-shaped configuration with first and second leg portions.

13. The apparatus of claim 12 wherein said first support comprises:
    a first boss extending from said first leg portion;
    a second boss extending from said second leg portion;
    a first adjusting member adjustably engaged with said first boss; and
    a second adjusting member adjustably engaged with said second boss;
    wherein, said first and second adjusting members may be moved to supporting positions thereof against the first end of the second pipe fitting.

14. The apparatus of claim 13 wherein said first and second adjusting members are thumb screws.

15. The apparatus of claim 11 wherein said second support comprises:
    an arm holder connected to said first clamping jaw; and
    a support arm having a proximal end slidably engagable with said arm holder and a distal end adapted for engagement with the second end of the second pipe fitting.

16. The apparatus of claim 15 further comprising a locking member connected to said arm holder and adapted for locking said support arm with respect to said arm holder.

17. The apparatus of claim 16 wherein said locking member is a thumb screw threadingly engaged with said arm holder.

18. The apparatus of claim 15 wherein said arm holder comprises:
    a first pivot whereby said support arm may be pivoted about a first axis; and
    a second pivot whereby said support arm may be pivoted about a second axis.

19. The apparatus of claim 18 wherein said first axis is substantially perpendicular to said second axis.

20. The apparatus of claim 18 wherein said first pivot comprises:
    an internally threaded member on said arm holder; and
    a threaded rod threadingly engaged with said internally threaded member.

21. The apparatus of claim 18 wherein said second pivot comprises an externally threaded member threadingly engaged with said first clamping jaw.

22. A pipe fitting apparatus for use in connecting a first pipe fitting to a second pipe fitting, said apparatus comprising:
    a first clamping jaw having a clamping surface thereon;
    a second clamping jaw having a pair of clamping surfaces thereon, said first and second clamping jaws being pivotally connected and having a clamping position for clamping engagement with the first pipe fitting;
    a toggle connected to said first and second clamping jaws for selectively locking said first and second clamping jaws in said clamping position and releasing said first and second clamping jaws from said clamping position;
    an adjustable lower support on said second clamping jaw for supporting a lower first end of the second pipe fitting when the second pipe fitting is positioned adjacent to the first pipe fitting; and
    an upper support pivotally connected to said first clamping jaw for supporting an upper second end of the second pipe fitting when the second pipe fitting is positioned adjacent to the first pipe fitting, said upper and lower supports substantially rigidly holding the second pipe fitting adjacent to the first pipe fitting.

23. The apparatus of claim 22 wherein said lower support comprises:

a first boss extending from said second clamping jaw;

a second boss extending from said second clamping jaw, said second boss being angularly positioned with respect to said first boss;

a first screw threadingly engaged with said first boss and having an end adapted for engaging the second pipe fitting; and a second screw threadingly engaged with said second boss and having an end adapted for engagement with the second pipe fitting.

24. The apparatus of claim 23 wherein said first and second bosses are disposed substantially normally from one another.

25. The apparatus of claim 22 wherein said upper support comprises:

an arm holder comprising:

an arm holder defining an opening therein;

a pair of nuts attached to opposite ends of said arm adapter;

a threaded rod threadingly engaged with said nuts to form a first pivot; and a threaded post attached to said threaded rod and threadingly engaged with said first clamping jaw to form a second pivot;

a substantially L-shaped arm having a first end slidably engaged with said arm adapter and a second end adapted for engaging the upper second end of the second fitting; and locking means for locking said arm to said arm adapter.

26. The apparatus of claim 25 wherein said locking means comprises:

a nut attached to said arm adapter; and a screw threadingly engaged with said nut and having an end adapted for locking engagement with said first end of said arm.

27. The apparatus of claim 25 wherein said threaded post is substantially perpendicular to said threaded rod.

28. The apparatus of claim 25 wherein an axis of said threaded rod is substantially horizontal.

* * * * *